United States Patent [19]

Grimaldi et al.

[11] Patent Number: 5,254,837
[45] Date of Patent: Oct. 19, 1993

[54] THERMALLY ACTIVATED RETAINER MEANS UTILIZING SHAPE MEMORY ALLOY

[75] Inventors: Margaret E. Grimaldi; Leslie S. Hartz, both of Seabrook, Tex.

[73] Assignee: The United States of America as represented by the Administrator of the National Aeronautics and Space Administration, Washington, D.C.

[21] Appl. No.: 49,648

[22] Filed: Apr. 19, 1993

Related U.S. Application Data

[63] Continuation of Ser. No. 731,829, Jul. 15, 1991, abandoned.

[51] Int. Cl.⁵ .......................... B32B 23/02; H05B 3/00
[52] U.S. Cl. ..................... 219/200; 244/158 A; 244/121; 411/909; 403/408.1; 403/404
[58] Field of Search ............... 219/200, 201; 285/187; 244/158 A, 160, 121; 52/484; 403/404, 405.1, 408.1, 273; 60/523, 527–529; 411/909; 29/447

[56] References Cited

U.S. PATENT DOCUMENTS

| | | | |
|---|---|---|---|
| 3,569,901 | 3/1971 | Connor | 411/909 |
| 3,748,108 | 7/1973 | Rothwarf et al. | 29/195.5 |
| 3,801,954 | 4/1974 | Dorrell | 285/187 |
| 4,044,358 | 8/1977 | Manning et al. | 343/18 A |
| 4,106,179 | 8/1978 | Bleckmann | 29/432 |
| 4,308,309 | 12/1981 | Leiser et al. | 428/193 |
| 4,469,357 | 9/1984 | Martin | 285/381 |
| 4,485,816 | 12/1984 | Krumme | 411/909 |
| 4,487,465 | 12/1984 | Cherian | 339/30 |
| 4,520,601 | 6/1985 | Stacey, Jr. | 52/127.7 |
| 4,679,292 | 7/1987 | Mead | 29/447 |
| 4,720,944 | 1/1988 | Loicq | 52/484 |
| 4,743,079 | 5/1988 | Bloch | 439/161 |
| 4,754,538 | 7/1988 | Stewart, Jr. et al. | 29/447 |
| 4,810,201 | 3/1989 | de Mendez et al. | 439/161 |
| 4,899,744 | 2/1990 | Fujitsuka et al. | 606/153 |
| 4,900,078 | 2/1990 | Bloch | 294/119.1 |
| 5,024,549 | 7/1991 | Dalby | 403/404 |
| 5,030,016 | 7/1991 | Schoeffter | 384/448 |
| 5,040,283 | 8/1991 | Pelgrom | 405/150 |
| 5,120,175 | 6/1992 | Arbegast et al. | 411/903 |
| 5,160,233 | 11/1992 | McKinnis | 411/909 |

FOREIGN PATENT DOCUMENTS 62-198785 9/1987 Japan.
1417881 8/1988 U.S.S.R..

OTHER PUBLICATIONS

"Nitinol as a Fastener Material", SAMPE Q., vol. 5, No. 2, Jan. 1974, pp. 17–21, Author: Schwenk et al.
"Advanced Materials for ESA Spacecraft", B. D. Dunn, ESA J. (Netherlands), vol. 11, No. 2, pp. 153–166, 1987.

*Primary Examiner*—Bruce A. Reynolds
*Assistant Examiner*—John A. Jeffery
*Attorney, Agent, or Firm*—Hardie R. Barr; Guy M. Miller; Edward K. Fein

[57] ABSTRACT

A retainer member (2) suitable for retaining a gap filler (1) placed in gaps (20) between adjacent tile members (21, 22). One edge of the retainer member (2) may be attached to the gap filler (1) and another edge may be provided with a plurality of tab members (4, 5, 6, 7, 8, 9) which in an intermediate position do not interfere with placement or removal of the gap filler (1) between tile members (21, 22). The retainer member may be fabricated from a shape memory alloy which when heated to a specified memory temperature will thermally activate the tab members (4, 5, 6, 7, 8, 9) to predetermined memory positions engaging the tile members (21, 22) to retain the gap filler (1) in the gap (20).

11 Claims, 3 Drawing Sheets

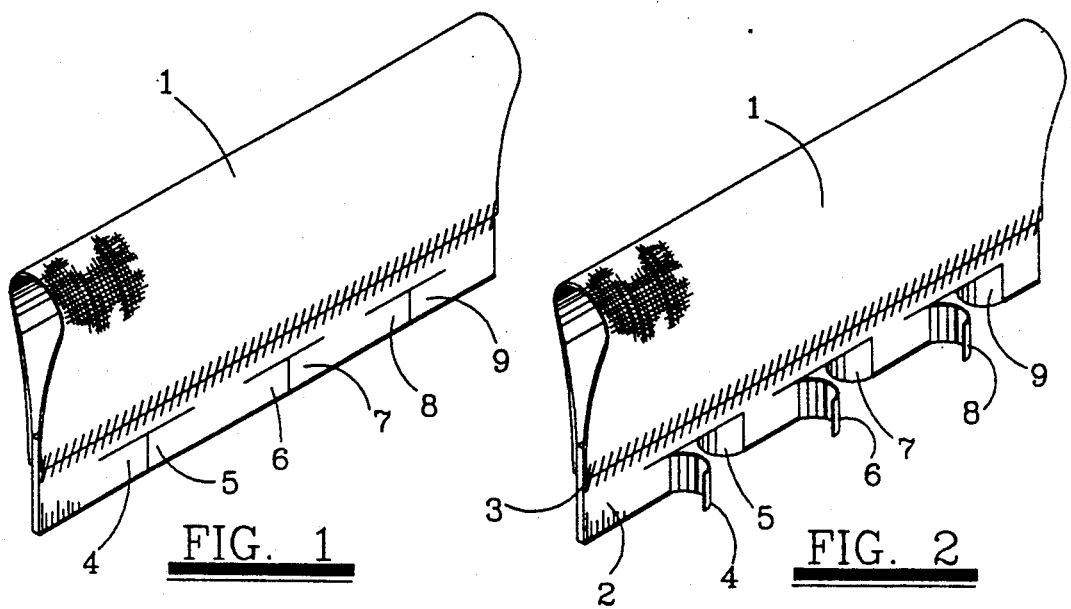
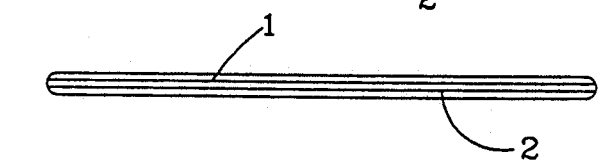
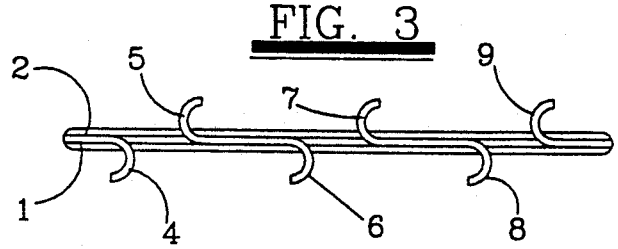
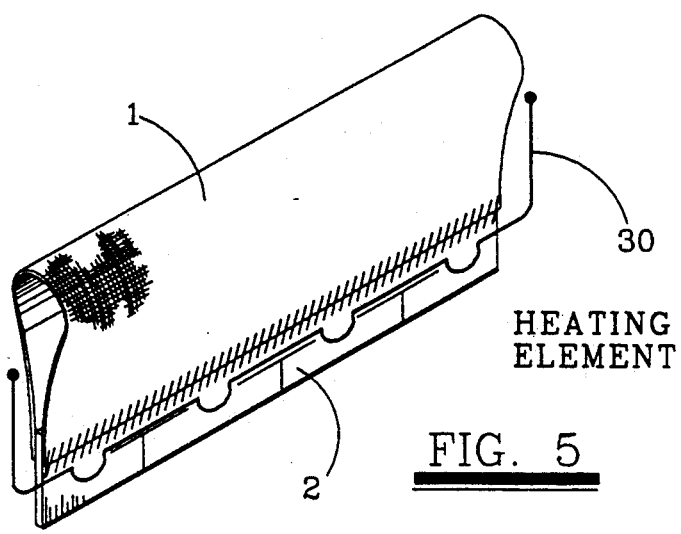

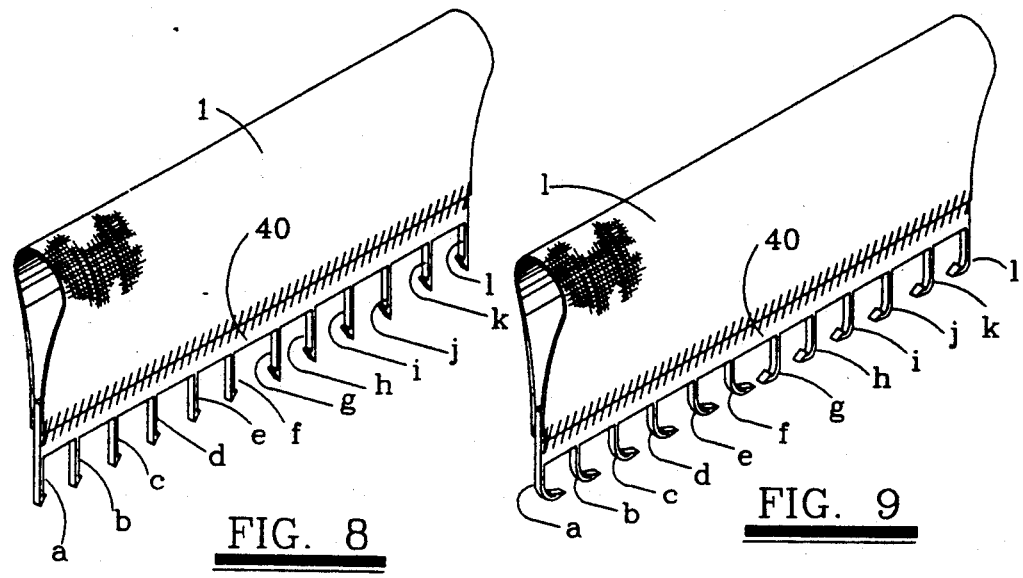
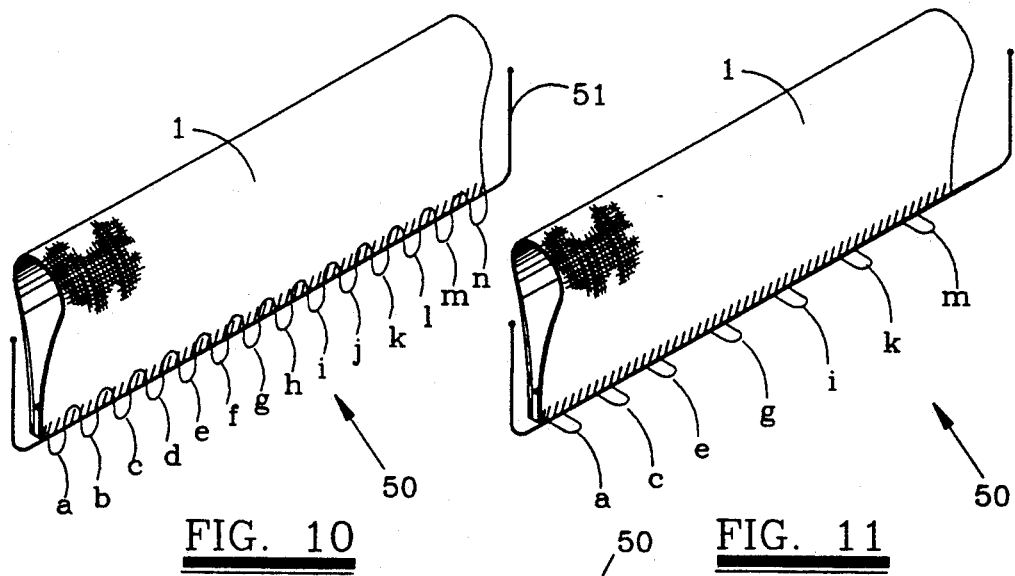
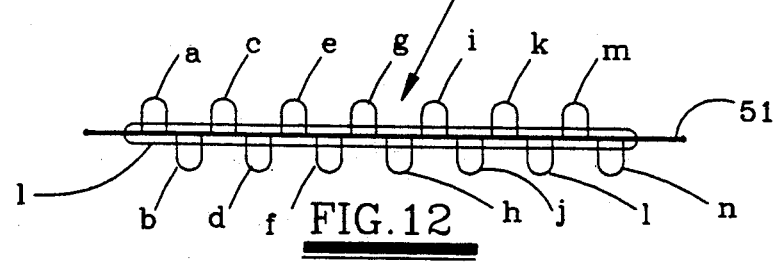

THERMALLY ACTIVATED RETAINER MEANS UTILIZING SHAPE MEMORY ALLOY

ORIGIN OF THE INVENTION

The invention described herein was made by employees of the United States Government and may be manufactured and used by or for the Government of the United States of America for governmental purposes without the payment of any royalties thereon or therefor.

This application is a continuation of application Ser. No. 07/731,829, filed Jul. 15, 1991, now abandoned.

TECHNICAL FIELD

The present invention pertains to apparatus for retaining gap fillers placed in gaps between adjacent tile members. More specifically, the present invention pertains to gap filler retaining apparatus which does not interfere with placement or removal of gap fillers between tile members but which is deflectable upon thermal activation to positions engaging the tile members or the substructure underneath and between tile members to retain the gap filler between the tile members. While the apparatus of the present invention is suitable for a number of uses requiring retaining mechanisms in inaccessible locations, it is particularly suitable for retaining gap fillers between the ceramic tiles installed as heat shields on space vehicles, such as the Orbiter.

BACKGROUND ART

Thermal tiles are installed on space vehicles, such as the Orbiter, to protect the space vehicle from overheating during reentry into the Earth's atmosphere. Such tiles are usually installed in such a way that gaps are maintained between each tile on the vehicle. However, high pressure gradients can exist along the vehicle surface and adverse thermal effects may then result from the flow of gasses through these gaps, particularly during reentry through the Earth's atmosphere. To minimize adverse gap heating, gap fillers are presently installed in these critical gaps during vehicle assembly after the tiles have been installed. Gap fillers may also be installed at any time after vehicle assembly when additional critical areas are identified.

Gap fillers may be made of various materials and configurations. An example of such a gap filler may be seen in U.S. Pat. No. 4,308,309. Currently, such gap fillers are secured by bonding them with room temperature vulcanizing (RTV) polymer to the filler bar located underneath and between the tiles. RTV, e.g. composition of silicone rubber, is placed between the tiles along the filler bar and then the gap filler is inserted between the tiles to form a bond. This type of installation is described in the aforementioned U.S. Pat. No. 4,308,309.

There is a significant disadvantage associated with RTV installation of gap fillers between tiles. Installing the gap filler with RTV is an operation which is difficult to perform properly in a time efficient manner. RTV is often smeared along the sides of the tiles because the gaps are small, e.g. 0.030 to 0.060 inches. During ascent and reentry of the space vehicle to which the tiles and gap fillers are attached, high tile temperatures causes the RTV to burn off the sides of the tiles and the RTV no longer provides an adequate bond to the vehicle. This is why the gap filler is intended to be bonded to the filler bar instead of the tile. As the gap fillers are currently installed, it is difficult to verify whether the gap filler is being held in place by an RTV bond to the side of the tiles or by a bond established with the filler bar. Since the structural integrity of each installation is unreliable, as described above, many gap fillers have become detached and lost during flight. As a result, increased heating of the vehicle may occur, increasing the possibility of large scale structural repair.

Thus, the current methods of installing gap fillers in the gap between tiles or, for that mutter, installing any structure in gaps or narrow spaces, are not satisfactory for many applications. Retaining apparatus and methods for such gap fillers can be improved in reliability, installation time, and structural integrity.

STATEMENT OF THE INVENTION

In accordance with the present invention, apparatus is disclosed for retainers placed in gaps and narrow spaces between adjacent objects, such as the tile members used as heat shields on space vehicles. One edge of the retainer apparatus of the present invention may be affixed to an edge of a gap filler with an opposite edge of the retainer apparatus providing a plurality of tab members which in intermediate positions do not interfere with placement or removal of the gap filler between the tile members. The retainer apparatus is fabricated from shape memory alloy which, when attaining a particular memory temperature, thermally activates the tabs for deflection to predetermined memory positions engaging the tile members or the substructure underneath and between the tile members to retain the gap filler between the tile members.

The tabs of the retainer apparatus of the present invention, which may be of various configurations, are made of a shape memory alloy which may be programmed to respond to a specified memory temperature for movement to the memory positions by first physically deflecting the tabs to the desired memory positions and heating the shape memory alloy to a specified setting temperature while the tabs are restricted to the memory positions. Then the shape memory alloy is allowed to cool after which the tabs may be deformed to intermediate positions for placement in the gaps between tiles.

There are several unique features of the present invention, particularly as applied to gap fillers used between the tiles of space vehicles. For one, metal retaining mechanisms have never been utilized to secure tile gap fillers between tiles in space vehicles, such as the Orbiter. In addition, application of shape memory alloy is unique in this service. The small thickness of the retaining apparatus of the present invention and the methods used for activation thereof allow for application with a substantial variance of gap sizes and inaccessible locations without compromising functionality or efficiency of the apparatus.

The retaining apparatus of the present invention, as compared to the current method of RTV bonding of gap fillers, has several advantages. First, the retaining apparatus is easier to install. The gap filler is simply inserted between tiles and allowed to reach the memory temperature required to restore the memory shape of the alloy. Secondly, it is easier to verify that the retaining mechanism has been properly installed. Restoring the alloy to its memory configuration ensures that the mechanism has deflected in a predetermined direction and is properly embedded in the desired location. Finally, if the retaining apparatus experiences any damage during flight in which deformation of the apparatus occurs, the high temperatures experienced during reentry into the Earth's atmosphere will attempt to reactivate the memory configuration and restore the retaining apparatus to its original installed condition. Many other objects and advantages of the invention will be apparent from reading a description which follows in conjunction with the accompanying drawings.

BRIEF DESCRIPTION OF THE DRAWINGS

Details of the invention will be described in connection with the accompanying drawings in which:

FIG. 1 is a pictorial representation of a gap filler for placement in gaps between adjacent tile members along an edge of which is affixed a retainer member, in an intermediate position, according to a preferred embodiment of the invention;

FIG. 2 is a pictorial representation of the gap filler and retaining apparatus of FIG. 1, showing the retaining apparatus in its memory position, according to a preferred embodiment of the invention;

FIG. 3 is the gap filler and retaining apparatus of FIG. 1, as viewed along the bottom edge thereof;

FIG. 4 is the gap filler and retaining mechanism of FIGS. 1 and 2, as viewed along the bottom edge of FIG. 2;

FIG. 5 is a pictorial representation of the gap filler and retaining apparatus of FIGS. 1 and 2, showing the retaining apparatus in the intermediate position of FIG. 1 and showing how a heating element could be placed thereon;

FIGS. 8 and 9 are pictorial representations of a gap filler and retaining apparatus, according to an alternate embodiment of the invention, FIG. 8 showing the intermediate position of the retainer apparatus and FIG. 9 showing the memory position thereof;

FIGS. 10 and 11 are pictorial representations of gap fillers and retaining apparatus, according to still another embodiment of the invention, FIG. 10 showing the intermediate position of the retaining apparatus and FIG. 11 showing the memory position thereof; and FIG. 12 is an edge view of the gap filler and retaining apparatus of FIGS. 10 and 11, as viewed along the bottom edge in FIG. 11.

DETAILED DESCRIPTION OF THE INVENTION

Figure 6:
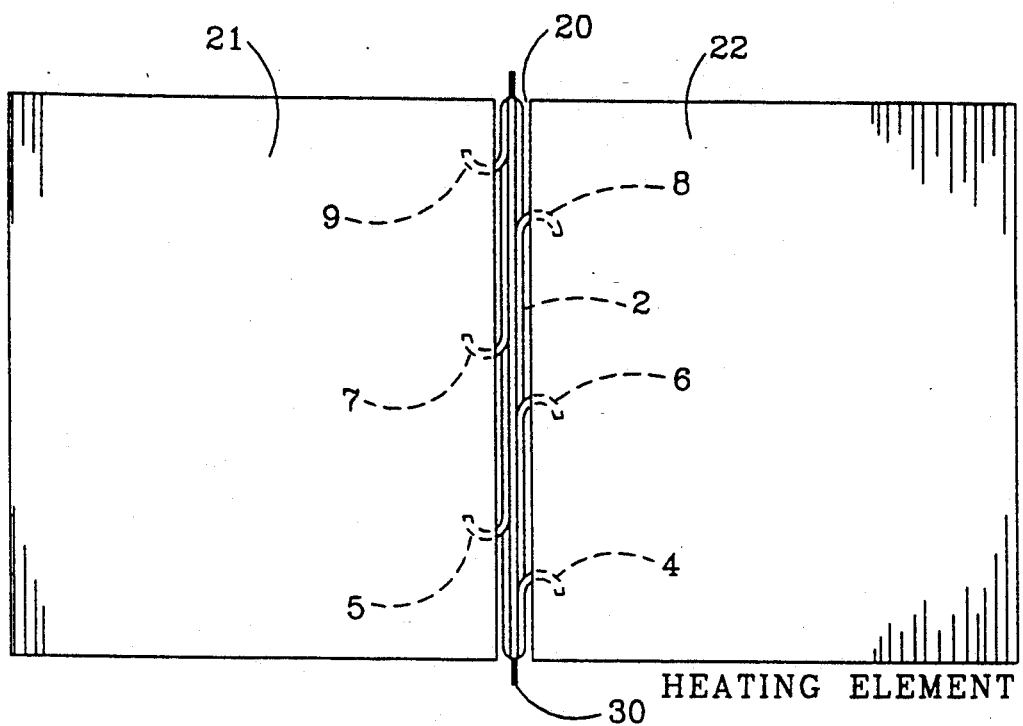
FIG. 6 is a plan view of a pair of tile members showing a gap filler and retaining apparatus placed in the gap therebetween, according to a preferred embodiment of the invention, in the memory position of FIGS. 2 and 4.

Referring first to FIG. 1 there is shown a gap filler 1 for placement in gaps between adjacent tile members (not shown) and along an edge of which is affixed one edge of a retainer member 2. The gap filler 1 may be made of any number of materials, e.g. ceramic cloth. The free ends of the gap filler 1 can be attached by gluing, sewing, or some other method of bonding at 3 to the retainer 2.

The retainer 2 is made of a unique metallic substance herein referred to as "shape memory alloy." Shape memory alloys, of which Nitinol is one, may be physically deformed into a "memory position", heated to a specified setting temperature while restricted in the memory position, cooled and then returned to some intermediate position. Then the shape memory alloy may be heated to a memory temperature which will thermally activate the alloy for return to its predetermined memory position. This unique mechanical memory characteristic, still only partially understood, is the result of a reversible, stress-induced martensitic transformation. When heated above a certain "setting" temperature while constrained to a particular shape, the alloy will return to the memory shape even after it has been plastically deformed in the interim. The amount of allowable plastic deformation is limited however. The return, or recovery to its memory shape is brought about by heating the alloy above its transition temperature range, which is well below the setting temperature at which it was "memory heat treated".

In the preferred embodiment of FIGS. 1-7, the retainer 2 is fabricated of a rectangular piece of approximately 0.02 inch thick shape memory alloy plate which is stamped or cut in such a way as to form tabs 4, 5, 6, 7, 8, 9, as shown in FIG. 1. The number and size of the tabs may vary.

The tabs, as shown in FIG. 1, may be said to be in their intermediate position. Prior to attachment to the gap filler 1, the tabs may have been previously deformed or deflected alternately to one side and the other, as illustrated in FIGS. 2 and 4, and programmed in these "memory positions" by heating to a predetermined setting temperature, while the tabs were restricted to their memory positions. After the shape memory alloy has cooled, the tabs may be physically returned to the intermediate positions of FIGS. 1 and 3 and the retainer member attached to the filler member by sewing, gluing or otherwise bonding along the margins 3.

With the retainer 2 and its tabs 4-9, in the intermediate positions of FIG. 1, the tile gap filler 1 and retainer 2 are inserted in a gap 20 between adjacent tile members 21 and 22 (see FIGS. 6 and 7), such as the ceramic tile members used in heat shields of space vehicles, such as the Orbiter. As shown in FIGS. 7, the tiles 21 and 22 rest on strain isolation pads 23, 24 and a filler bar 25 therebetween.

A layer of bonding material 26, 27 (the thickness of which is exaggerated in FIG. 7) may exist therebetween. The gap filler 1 and attached retainer 2 would be first inserted into the tile gap 20 in the intermediate position of FIGS. 1 and 3. Prior to installation in the gap, a small nichrome heating element 30 may be mounted on one face of the retainer 2 as shown in FIG. 5. This is one method of heating the shape memory alloy after installation. Of course, many other methods are available. For example, the setting temperature may be room temperature and the shape memory alloy may be cooled at intermediate positions.

Figure 7:
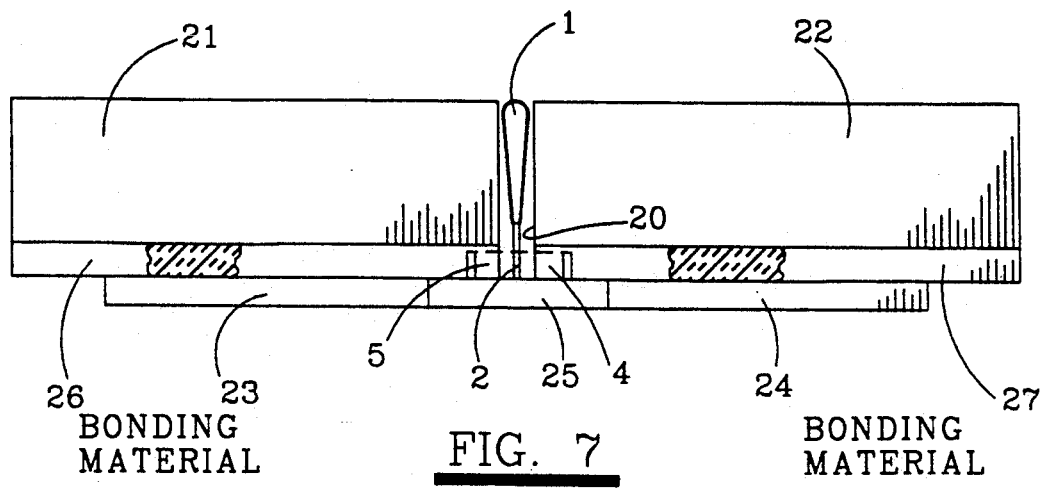
FIG. 7 is a cross-sectional view of the tiles, gap filler and gap filler retaining apparatus of FIG. 6.

After the gap filler 1 and retainer 2 have been inserted into the tile gap 20, as shown in FIGS. 6 and 7, heat is applied to the shape memory allow retainer 2 by passing a current through the heating element 30, heating the shape memory alloy to a transition or "memory" temperature at which the tabs 4-9 are thermally activated for deflection to the previously predetermined memory positions of FIGS. 2 and 4 and 6 and 7. The tabs 4-9 engage and become embedded in the tile members 21 and 22. Alternate embodiments allow attachment to the substructure 25 which lies beneath and between tile members 21 and 22. The gap filler 1 is firmly anchored in the tile gap 20 preventing it from coming loose under the loads of ascent and reentry.

Although the embodiment described with reference to FIGS. 1–7 is a preferred embodiment, there are many other configurations possible. FIGS. 8 and 9 illustrate another embodiment in which the tabs of a shape memory alloy retainer 40 are finger-like extensions a, b, c, d, e, f, g, h, i, j, k, l, the distal ends of which project downwardly straight from proximal ends in the intermediate position of FIG. 8 but which curve when in memory positions of FIG. 9, to form hook-like extensions for engagement with the tile members or their substructure when the gap filler 1 and retainer 40 are placed in a tile gap, such as tile gap 20 of FIGS. 6 and 7. In the embodiment of FIGS. 8 and 9, some of the extensions a, b, c, d, e, f, curve in one direction and others of the extensions g, h, i, j, k, l, curve in an opposite direction to prevent apparatus movement in any one direction during installation.

FIGS. 10, 11 and 12 illustrate still another embodiment in which the retainer 50 comprises wire alternately bent in substantially one hundred eighty degree turns to form, in the intermediate positions of FIG. 10, downwardly depending wire tabs a, b, c, d, e, f, g, h, i, j, k, l, m, which are aligned in a generally uniform elongated array but which in the memory positions of FIGS. 11 and 12 are deflected outwardly therefrom. In the embodiment of FIGS. 10–12, these wire tabs (a–m) are alternately deflected in opposite directions. The retainer 50 and the wire tabs formed thereby may be made from a single wire 51, the ends of which may be placed across an electrical voltage for applying the heat necessary to raise the temperature of the shape memory alloy to its memory temperature for deflection to the memory position of FIGS. 11 and 12.

The finger-like extensions or hooks of the embodiments of FIGS. 8 and 9 and the wire tabs of the embodiment of FIGS. 10–12 function similarly to the tabs of the preferred embodiment shown in FIGS. 1–7 embedding themselves into adjacent tiles or substructures firmly holding the attached gap filler 1 in the tile gap. Of course, many other shapes may be used.

Thus, the present invention provides retainer apparatus for retaining gap fillers placed in gaps between tile members. The retainer apparatus is formed from a unique shape memory alloy which is physically deformed to an intermediate installation position but which may be heated to a specified memory temperature for thermal activation and deflection to predetermined memory positions engaging the tile members or the substructure underneath and between the tile members to firmly retain the gap filler in the tile gap. The retaining apparatus has several advantages over the RTV bonding method currently used. First, the retaining mechanism is easier to install than current methods. The gap filler and retainer are simply inserted between the tiles and the retainer thermally activated by heating to its memory temperature to restore the shape memory alloy to its memory shape. Second, it is easier to verify that the retaining mechanism has been properly installed. Restoring the shape memory alloy to its memory configuration ensures that the mechanism is embedding itself into the tiles in the desired location. Third, in space flight, if the retaining mechanism experiences any damage during the flight in which deformation of the retainer mechanism to an alternate, non-fastening state has occurred, the extreme temperatures on orbit or the heat of reentry may suffice to reactivate memory configuration restoring the retainer to its original installed condition. The size of the retaining mechanism and the method used for activation allow for application to a variety of gap sizes without compromising functionality of the mechanism.

Several preferred embodiments of the invention have been described herein. Many other embodiments can be made by those skilled in the art. Accordingly, it is intended that the scope of the invention be limited only by the claims which follow.

We claim:

1. Gap filler having retainer means for retaining gap filler within void between adjacent structural members, said gap filler comprising a flat flexible portion having a plurality of edges, said flat flexible portion being folded such that two opposing edges are adjacent; said retainer means comprising a member having a plurality of edges, one edge of said retainer means being attachable to said two adjacent edges of said flat flexible portion and an opposite edge of said retainer means providing a plurality of depending tab members which in intermediate positions do not interfere with placement or removal of said gap filler between said tile members, said retainer means being fabricated from shape memory alloy which when heated to a specific memory temperature will thermally activate said tab members for deflection to predetermined memory positions engaging adjacent structural members to retain the gap filler between the structural members.

2. Gap filler of claim 1 wherein said flat flexible portion comprises a ceramic cloth.

3. Gap filler of claim 1 wherein said retainer means comprises an elongate flat member cut along an edge thereof to provide said tab members which in said intermediate positions are essentially longitudinally aligned but which in said memory positions are deflected outwardly therefrom.

4. Gap filler of claim 1 in which said tab members, when in said memory positions, are alternately deflected in opposite directions.

5. Gap filler of claim 1 in which said tab members comprise finger-like extensions, distal ends of which project downwardly from proximal ends, when in said intermediate positions, but which curve, when in said memory positions, to form hook-like extensions for engagement with said structural members.

6. Gap filler as set forth in claim 5 in which some of said extensions, when in said memory positions, curve in one direction and others of said extensions curve in an opposite direction.

7. Gap filler as set forth in claim 1 in which said retainer means comprises wire alternately bent in substantially one hundred and eighty degree turns to form, in said intermediate position, downwardly depending wire tab members which lie in a generally uniform elongated array but which in said memory positions are deflected outwardly therefrom.

8. Gap filler as set forth in claim 7 in which said wire tab members, when in said memory positions, are alternately deflected in opposite directions.

9. Gap filler as set forth in claim 1 further comprising a heating element disposed along said retainer means and by which said shape memory alloy may be heated to said memory temperature while placed between the structural members.

10. Gap filler apparatus for placement in gaps between adjacent tile members comprising a gap filler member; said gap filler member comprising an elongate flexible member having a plurality of edges including two opposing edges, said flexible member being folded so that two opposing edges are adjacent and along which said adjacent opposing edges is affixed one edge of a retainer member, another edge of said retainer member providing a plurality of depending tab members which in intermediate positions do not interfere with placement or removal of said filler member and retainer member between the tile members, said retainer member being fabricated from shape memory alloy which when allowed to reach a specified memory temperature will thermally activate said tab members for deflection to pre-determined memory positions engaging the tile members and embedding the tab members in the tile members to retain said gap filler apparatus between the tile members.

11. Gap filler apparatus as set forth in claim 10 in which said setting temperature is greater than said memory temperature.

* * * * *